Dec. 11, 1962  G. A. REYNOLDS  3,067,888
EARTH MOVING VEHICLE
Filed Dec. 14, 1960  3 Sheets-Sheet 1
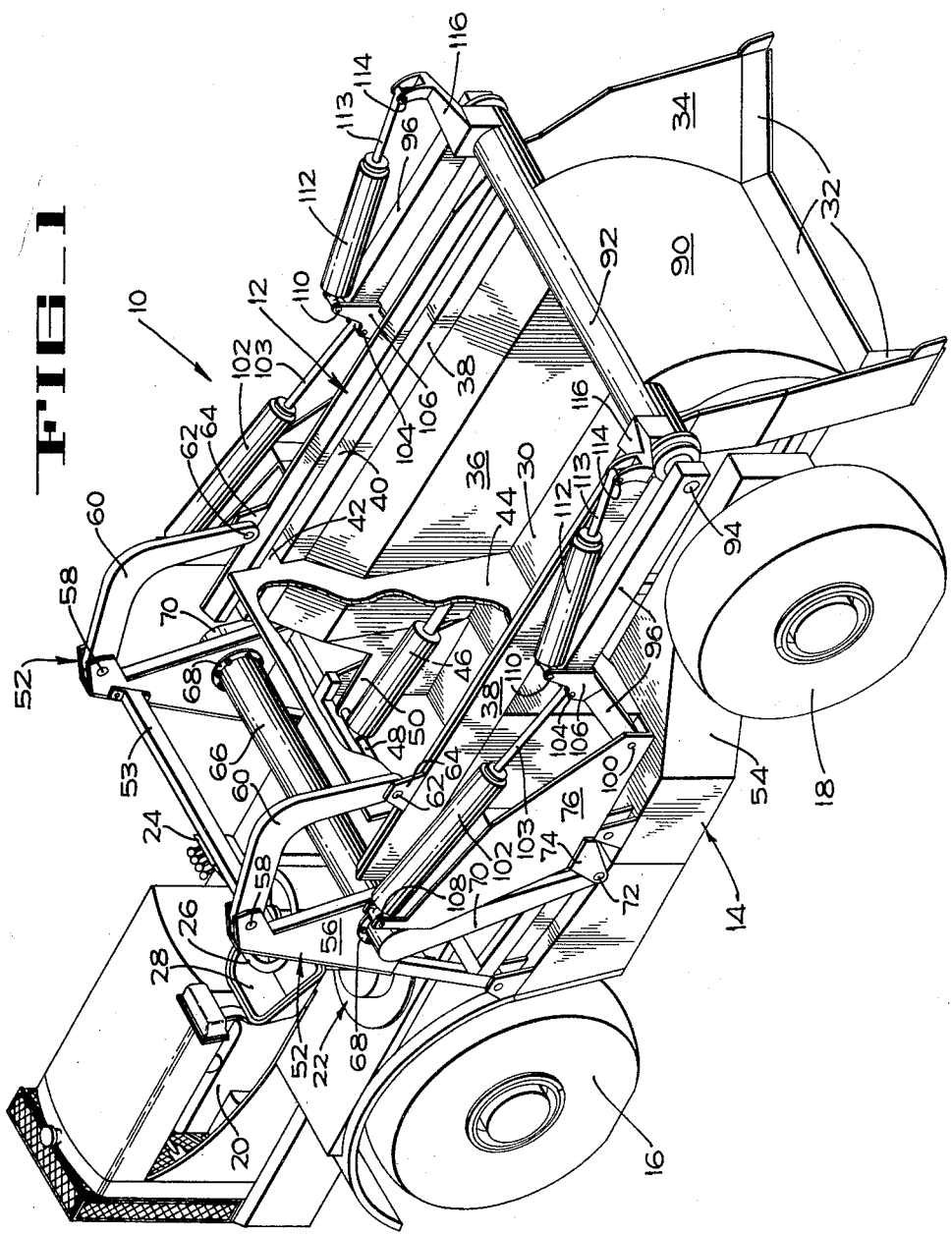
INVENTOR
GEORGE A. REYNOLDS
BY *Hans G. Hoffmeister*
ATTORNEY

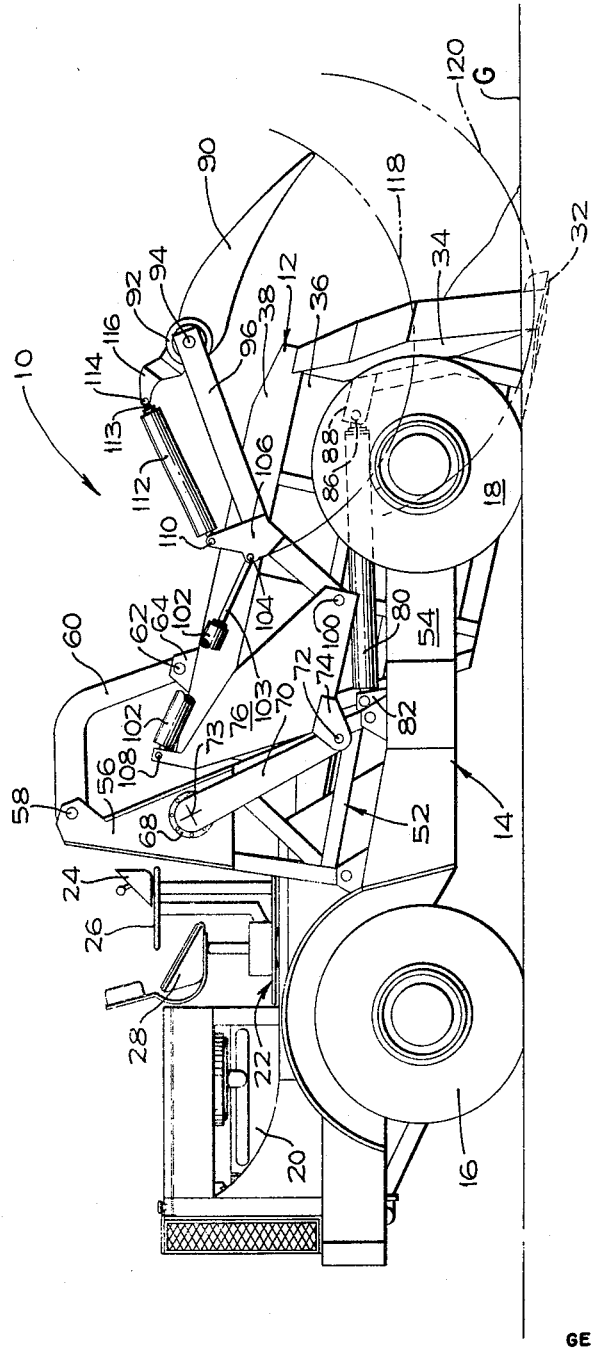

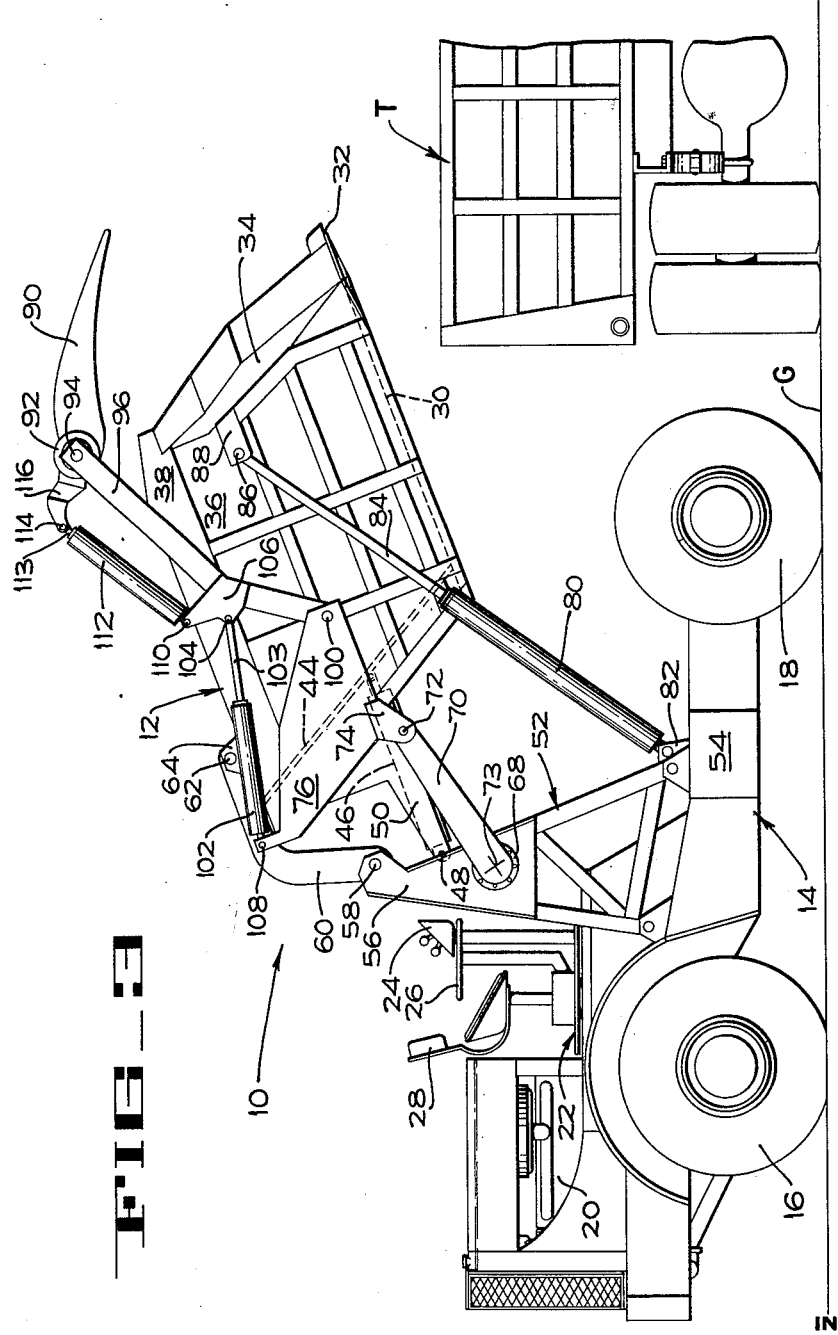

United States Patent Office 3,067,888
Patented Dec. 11, 1962

3,067,888
EARTH MOVING VEHICLE
George A. Reynolds, San Jose, Calif., assignor to FMC Corporation, a corporation of Delaware
Filed Dec. 14, 1960, Ser. No. 75,747
4 Claims. (Cl. 214—140)

The present invention pertains to earth moving equipment, and more particularly relates to self-propelled scraper type earth movers.

It has previously been considered impractical to construct a large capacity earth moving vehicle capable of discharging material from its hopper into another vehicle such as a dump truck, because of the difficulty in elevating the hopper without, at the same time, destroying the vehicle's stability. When the capacity of the hopper is approximately nine cubic yards and the discharge elevation is about 10 feet from ground level, it will be readily appreciated that any sidewise movement of the hopper would render the vehicle very unsteady.

The present invention provides a large capacity scraper-type, self-propelled earth moving vehicle in which simplified and improved mounting means for the vehicle's hopper enable the discharge end of the hopper to be safely elevated to a dumping position at least as high as ten feet without unduly impairing the vehicle's stability. In addition, the vehicle of the present invention is a self-loading general purpose vehicle adapted to scrape, bulldoze, carry, and dump heavy materials such as earth, broken paving, and the like.

Accordingly, one of the objects of the present invention is the provision of an improved elevating mechanism and mounting linkage for the hopper of a scraper type earth moving vehicle.

Another object of this invention is to provide an earth moving vehicle having an improved hopper construction which is movable from a scraping position below the level of the ground on which the vehicle is supported to a discharge position at any elevation up to approximately ten feet above ground.

Another object of the present invention is to provide, for an earth moving vehicle, a hopper arrangement which facilitates dumping at elevated positions of approximately ten feet without danger of overturning the vehicle.

These and other objects and advantages of the present invention will become apparent from the following description and the accompanying drawings, in which:

FIG. 1 is an isometric of the earth moving vehicle of the present invention viewed from one side and from the rear, or loading end.

FIG. 2 is a side elevation of the vehicle shown in FIG. 1 during a scraping and loading operation.

FIG. 3 is a side elevation of the improved earth moving vehicle of the present invention shown in an elevated dumping position.

The improved earth moving vehicle 10 (FIGS. 1 and 2) of the present invention includes an open end hopper 12 which is cradled in a frame structure 14 that is mounted upon steerable front pneumatic wheels 16 and rear pneumatic wheels 18. Each wheel is driven through a drive train, not shown, by an engine 20 which overhangs the front wheels 16. The vehicle is steered by an operator stationed on a rotatable control turret 22 which mounts all of the controls of the vehicle, including a panel of hydraulic valves 24, a steering wheel 26, a seat 28 and the other usual controls for governing the speed, direction of travel and braking of the vehicle.

As is best shown in FIG. 1, the hopper 12 comprises a floor panel 30 which has a sharpened and hardened coplanar cutting bar 32 extending across its open end and extending diagonally outward at each side edge. A sloping panel 34 interconnects each side portion of the cutting bar 32 to an adjacent vertical wall 36 of the hopper. The upper portion of each hopper wall 36 flares outwardly and terminates in a sill member 38 which is coextensive with the wall and has an inwardly facing channel 40 formed therein. The channel 40 provides a guideway for a roller, not shown, which is secured to a lateral arm 42 of an ejector plate 44 that is movable longitudinally through the hopper. A pair of telescope type hydraulic cylinders 46 (one only being shown in FIG. 1) are mounted on a transverse bar 48, the ends of which are secured to two spaced cylinder mounting brackets 50. The brackets 50 are fixed to the ends of the hopper walls 36, and the piston rods of the cylinders 46 are connected to the ejector plate 44. With this arrangement, the ejector plate may be driven to move through the hopper and propel the material therein out the open discharge end, irrespective of the position of the hopper in relation to the frame 14.

Intermediate the ends of the frame 14, a superstructure 52 is mounted on the frame to provide an elevated mounting for linkages, to be presently described, that mount the hopper for vertical pivotal movement to and from engagement with the ground. In order that the hopper 12 be unobstructed during this movement, the frame 14 rearwardly of the superstructure 52 is generally U-shaped and is formed of spaced side rails 54 (only one being shown), each of which mounts one of the wheels 18 upon a stub axle, not shown.

In the mechanism to be described, only the parts associated with one side of the vehicle will be mentioned since the parts on the opposite side are identical, but oppositely disposed. In the drawings, the same reference numeral is used for identical parts on opposite sides of the machine.

The superstructure 52 comprises two fabricated triangular pedestals 56, one rigidly mounted atop each frame rail 54. The two pedestals are interconnected by suitable open transverse brace members, including a bar 53, that do not obstruct the operator's vision when he faces the hopper. The uppermost portion of each pedestal 56 carries a pivot shaft 58, upon which is mounted one end of a generally L-shaped upper hopper link 60. A pivot shaft 62 connects the other end of the link 60 to a bracket 64 that is welded on the sill 38.

A hollow transverse torque shaft 66 (FIG. 1) extends through aligned bearings 68, each of which is mounted on one of the pedestals 56. Affixed to each end of the torque shaft 66 is a rigid lower hopper mounting link 70, the two links 70 being aligned laterally of the vehicle and each is pivoted near its distal end on a stub-shaft 72. The stub shaft 72 is journalled in a bracket 74 which is secured to an outrigger support plate 76 that is rigidly fixed to the hopper 12.

It is to be noted in FIG. 2 that the linear distance between the pivots 58 and 62 of the upper link 60 is greater than the distance between the axis 73 of the torque tube 66 and the pivot 72. Also, the distance between the torque tube axis and the pivot 58 is substantially less than the distance between the pivots 62 and 72. Accordingly, it will be evident that elevation of the hopper 12 from the scraping position illustrated in FIG. 2 will, due to the lengths of the links and to the pivot point difference mentioned, progressively elevate the open end of the hopper at a faster rate than the closed end is raised. This motion, and the linkage effecting such motion, has particular utility in the earth moving vehicle of this invention, as will be mentioned later in connection with the operation of the vehicle.

The means for raising and lowering the hopper 12 and locking it at any selected elevation include a pair of double-acting hydraulic cylinders 80 (FIG. 2), only one being shown, each of which is pivotally mounted to an associated bracket 82 that is fixed to the upper surface of the side rail 54 at a point adjacent the pedestal 56. The piston rod 84 of the cylinder is pivoted at 86 to a strap 88 that is welded to the hopper side wall 36 near the open end of the hopper. In its fully retracted position, the piston rod positions the hopper at a point wherein the cutting bar 32 across the open end of the hopper is approximately 6 inches below the natural grade line G. When the piston rod is fully extended, the cutting bar 32 (FIG. 3) is about 10 feet above the grade line G. It is to be noted that the six member connection of the hopper to the superstructure 52 and the frame rails 54, i.e., the pairs of links 60 and 70 and pairs of cylinders 80, assures a rigid and stable structure even when the hopper is fully elevated.

A scoop shaped loading blade 90 (FIG. 1) is mounted at the rear of the hopper 12 and is integrally formed with a tubular member 92. Internal bearings, not seen, are provided in the tubular member 92 which journal a support shaft 94 that has each end fixed in a bent lifter arm 96, one lifter arm 96 being disposed at each side of the hopper 12. At its other end, the arm 96 is pivotally mounted on a pin 100 that is fixed to the outrigger support plate 76. A power cylinder 102 is pivotally connected by a pin 108 to the support plate 76 and has a piston rod 103 pivotally connected by pin 104 to a bracket 106 on the lift arm 96. The bracket 106 also pivotally mounts, at 110, a loading blade actuating cylinder 112. The piston rod 113 of cylinder 112 is pivoted at 114 to a lever arm 116 which is integrally formed on the end of the tubular member 92 of the loading blade 90. The cylinders 102 and 112, as well as the hopper elevating cylinders 80, are controlled by actuation of levers mounted on the control panel 24 at the operator's station.

When the loading blade cylinders 112 are fully extended, the loading blade 90 assumes the position on the lift arms 96 which is shown in FIG. 1. Also shown in FIG. 1 is the relative position of the lift arms 96 and the hopper 12 when the lift arm cylinders 102 are fully extended. Thus, full extension of the cylinders 102 and 112 causes the loading blade 90 to close off the open end of the hopper 12. When the cylinders 112 are actuated to reciprocate the loading blade 90, and the lift arms 96 are raised as shown in FIG. 2, the lower edge of the loading blade follows the path seen at 118. If the lift arms 96 are in their lowermost position, the path of the lower edge of the loading blade 90 is the path indicated at 120.

It is evident that both paths 118 and 120 will be effective to cause the loading blade 90 to scoop up any material adjacent the end of the hopper and move this material toward the closed end of the hopper. Although this loading action of the blade can be effectively used when the vehicle is not scraping, but is moved against a bank of relatively loose material, such as gravel, it is primarily intended for loading the closed end of the hopper when the vehicle is scraping, in order to take advantage of the hopper's large capacity.

After the vehicle has been loaded, the operator actuates the controls governing the hopper lift cylinders 80 (FIG. 3) whereby the fully loaded hopper is elevated until a dump truck T, or other bulk material carrier, can be moved thereunder. During or after elevation of the hopper, the lift arms 96 are raised, and the loading blade 90 is pivoted until the open end of the hopper is unobstructed. The ejector plate 44 is then moved toward the open end of the hopper by actuation of the hydraulic cylinders 46 and the material is forcibly ejected into the truck. Since the material is not dumped en masse, the resulting dumping and loading action is accomplished without mechanical shock to either the earth mover or the truck.

The particular advantages peculiar to the hopper mounting of the vehicle of the present invention result, as was mentioned before, from the difference in the length of the hopper links 60 and 70. These advantages are readily apparent by reference to FIG. 3, wherein it will be seen that when the hopper is elevated to a dumping position, the angular disposition of the hopper relative to a horizontal plane is such that actuation of the ejector plate 44 is restrained to only a minor degree by the weight of the material in the hopper. At the same time, the difference in length of the links and the distance between the pivot points of the links 60 and 70 are so related that the closed end of the hopper is raised only to the minimum extent necessary for rapid dumping and so that the load center of gravity is maintained as close as possible to the longitudinal midpoint of the vehicle.

Of particular importance is the torque tube 66 which interconnects the lower hopper links 70 and provides a rigid connection therebetween to prevent any transverse tipping of the forward end of the hopper. The rear end of the hopper floor is held positively in a position parallel to the vehicle during elevation of the hopper by the double acting hydraulic cylinders 80.

It will be recognized, too, that the hopper mounting provided in the present invention causes the compound action of a combined vertical movement and fore and aft rotation of the hopper during its raising or lowering. Therefore, in addition to the hopper being advantageously positioned when in its uppermost position as described, in its lowermost position the angular relation of the hopper to the ground is such that the power requirements for scraper loading are minimized because the hopper floor is as close to horizontal as is practicable.

From the foregoing description, it will be evident that the novel hopper mounting linkage of the earth moving vehicle 10 provides a rigid and durable mounting construction, notwithstanding the fact that the fully loaded hopper can be elevated to discharge from a relatively high position. It will also be recognized that this desirable mounting has been achieved without unduly complex mechanism; in fact, this mounting has been effected with a noteworthy economy of parts.

While a particular embodiment of the present invention has been shown and described, it will be understood that the particular details herein set forth are capable of modification and variation without departing from the principles of the invention and that the scope of the invention should be limited only by the scope and proper interpretation of the claims appended hereto.

The invention having thus been described, that which is believed to be new, and for which protection by Letters Patent is desired, is:

1. An earth moving vehicle comprising a mobile frame, a material receiving hopper having a flat floor and a cutting bar on said floor adjacent the open rear end of said hopper, means mounting said hopper for movement on said frame from a lowered scraping position in which said floor is slanted downwardly and rearwardly and an upper unloading position in which said floor is slanted upwardly and rearwardly, said mounting means including an upper and a lower arm disposed on each side of said hopper with the two upper arms being disposed opposite each other to provide an upper pair of hopper support arms and the two lower arms being disposed opposite each other laterally of said hopper to provide a lower pair of support arms, and pivot means pivotally connecting each of said arms between said hopper and said frame, each upper arm being longer than the lower arm therebelow to cause said bed to assume said downwardly inclined scraping position and said upwardly inclined unloading position incident to pivoting of said hopper, the pivot means associated with one pair of arms including a transverse torque resisting member interconnecting the arms to resist forces tending to pivot one of said arms relative to the other, and power means connected between said frame and said hopper for pivoting said hopper on said arms.

2. An earth moving vehicle comprising a mobile frame having spaced side rails, a superstructure spanning said frame intermediate its length, an open end hopper arranged for vertical movement between said side rails, a lower link at each side of said frame pivotally connected to the upper portion of said superstructure and to said hopper, an upper link at each side of said frame longer than said lower links and pivotally connected to the uppermost portion of said superstructure and to said hopper, the distance between said pivotal connections to said superstructure being less than the distance beween said pivotal connections to said hopper, the pivotal connection of said lower links to said superstructure including a transverse torque resisting member interconnecting said lower links, and power means for pivoting said hopper to and from engagement with the ground whereby the inclination of the hopper when its floor is below said side rails is downward toward its open end and the inclination of the hopper when its floor is above said side rails is upward toward its open end.

3. An earth moving vehicle comprising a mobile frame, a material receiving hopper having a flat floor and a scraper blade on said floor adjacent the open rear end of said hopper, means mounting said hopper for movement on said frame from a lowered scraping position in which said floor is slanted downwardly and rearwardly and an upper unloading position in which said floor is slanted upwardly and rearwardly, said mounting means including an upper and a lower arm disposed on each side of said hopper and pivotally connected between said hopper and said frame, each upper arm being longer than the lower arm therebelow to cause said bed to assume said downwardly inclined scraping position and said upwardly inclined unloading position incident to pivoting of said hopper, a torque tube interconnecting said lower arms to maintain alignment thereof and prevent transverse tipping of said hopper, and power means connected between said frame and said hopper for pivoting said hopper on said arms.

4. An earth moving vehicle comprising a mobile frame, a material receiving hopper having a rearwardly facing open end and a cutting bar on the bottom wall thereof adapted to scrape material into said hopper upon rearward movement of the vehicle, means mounting said hopper on said frame for movement thereon from a scraping position that is downwardly inclined and toward the rear of the vehicle to a dumping position upwardly inclined in the same direction; said mounting means including a superstructure spanning said frame forwardly of said hopper, an upper link at each side of said hopper pivotally connected at its rearward end to the upper forward portion of said hopper and at its forward end to the upper portion of said superstructure, a torque tube rotatably mounted in said superstructure and extending transversely of said frame, a lower link at each side of said hopper shorter than said upper links and pivoted to the lower portion of said hopper and fixed to opposite ends of said torque tube for conjoint swinging movement about the axis of said torque tube to prevent transverse tipping of said hopper, the distance between the forward ends of said links at each side of the hopper being less than the distance between their rearward ends; and a power cylinder at each side of said hopper pivotally connected to said frame and to the upper rear portion of said hopper for simultaneous operation causing vertical pivotal movement of the hopper between scraping and dumping positions.

References Cited in the file of this patent

UNITED STATES PATENTS

| 2,638,237 | Struthers et al. | May 12, 1953 |
| 2,671,570 | Richey | Mar. 9, 1954 |
| 2,795,872 | Wardle | June 18, 1957 |

FOREIGN PATENTS

| 750,406 | Great Britain | June 13, 1956 |